Patented Oct. 17, 1944

2,360,645

UNITED STATES PATENT OFFICE 2,360,645

COMPOSITION AND PROCESS OF PREPARING SAME

Donald S. Bruce and Ralph T. Halstead, Somerville, N. J., assignors to Johns-Manville Corporation, New York, N. Y., a corporation of New York No Drawing. Application December 12, 1941, Serial No. 422,680

3 Claims. (Cl. 260—38)

This invention relates to a product and process of preparing a composition containing asbestos fibres, resinous components and sulphur. It relates particularly to the method of preparation of a composition and to a composition suitable for heat treatment in which the color of the final product is substantially uniform and consistent at all times.

It has heretofore been known that in compositions containing asbestos fibres and resinous components, particularly Bakelite resin, the color of the final composition has a tendency to acquire a pinkish cast. This discoloration in some cases is quite uniform throughout the product and in other cases is spotty, but as a general rule it is undesirable in commerce. It has been found that it is substantially impossible to eliminate the undesirable discoloration, even though the composition had admixed thereto materials such as carbon black.

It is an object of the present invention to prepare a composition suitable for heat treatment and adapted to be molded into materials such as brake bands, clutches or other products wherein synthetic resins and asbestos fibres are used in combination without discoloration.

It is also an object of the present invention to prepare an asbestos fibre and resinous composition which will not have a tendency to develop a pink discoloration during storage of the uncured material.

Additional objects of the invention will become apparent to those skilled in the art upon the application of the present improvement in industrial practice.

Broadly stated, the invention comprises the addition of sulphur in relatively small quantities to a composition containing asbestos fibres and resinous components. The composition also preferably contains pulverized or powdered carbon for purposes ordinarily attributed to the use of such carbonaceous materials in compositions suitable for brake linings or similar materials. The sulphur may be in any form, such as flowers of sulphur or the like.

It has been found that if the amount of sulphur added to the composition is not appreciably below 1.25%, based on the dry weight of the composition, the pink discoloration ordinarily obtained in the absence of sulphur does not occur. If the quantity of sulphur added is appreciably below 1.25%, based on the dry weight of the composition, the depth of the pink discoloration varies from a condition considered satisfactory to one definitely unsatisfactory. Under these circumstances, that is, where the quantity of sulphur was below 1.25%, in some batches discoloration occurred, having faint traces of pink discoloration, while in other cases no discoloration occurred.

The invention may be more fully understood by reference to the following illustrated examples.

Example I

Compositions containing the following distribution of components were prepared:

|  | Formulation A | Formulation B |
|---|---|---|
| Asbestos fibers | 80 | 80 |
| Bakelite resin | 12 | 12 |
| Powdered carbon black | 3 | 3 |
| Sulphur | --------- | 5 |
|  | 95 | 100 |
| Water | 10 | 10 |
|  | 105 | 110 |

The compositions were prepared by dry mixing the several components together in order to obtain uniform distribution of all of the materials and then adding water as specified thereto. The composition as prepared under formulation A tends to develop a pink color either during drying of the uncured materials or during the baking operation when the composition is placed in molds. The compositions as prepared under formulation B did not develop a pink discoloration either during storage of the uncured materials, during subsequent baking operations, or during storage of the fully baked compositions. This inhibiting effect of discoloration is due primarily to the presence of the sulphur as illustrated in formulation B.

Example II

The following composition was placed in an agitator and mixed for ten minutes.

| | | |
|---|---|---|
| Asbestos fibres | 20 lbs. | 0 oz. |
| Powdered resin | 4 lbs. | 8 oz. |
| Powdered carbon black | 0 lbs. | 14 oz. |
| Service sheet scrap (screened) | 5 lbs. | 3 oz. |
| Sulphur | 1 lb. | 3 oz. |
|  | 31 lbs. | 12 oz. |
| Water | 4 lbs. | 6 oz. |
|  | 36 lbs. | 2 oz. |

The required amount of water, as indicated in the formulation, was sprayed into the agitator while the composition was being mixed. The mixed composition was sheeted by known methods and cut into individual sheets. The individual sheets were then subjected to a hydraulic pressure of approximately 1600 lbs. per square inch for one minute and thereafter dried in an oven on steel plates at 100° F. No pink discoloration occurred in the dried pressed sheets after a period of five days' storage under atmospheric conditions.

The above sheets were then cut into sections and pressed in a brake block mold using a unit pressure of approximately 2000 lbs. per square inch and cured for about 30 minutes under 90 lbs. steam pressure. A waste scrap material such as results from cutting the sheets during the manufacture of brake and clutch bands, may be ground up for reuse as service sheet scrap in the compositions of Examples II and III. After the compressing action, the sections were placed in an oven and baked for 12 hours at about 100° F. During the entire operation and also in the finished product, there was no suggestion of a pink discoloration of the materials.

*Example III*

Another composition containing the following components:

| | |
|---|---|
| Asbestos fibres | 15 lbs. 0 oz. |
| Powdered resin | 4 lbs. 8 oz. |
| Powdered carbon black | 0 lbs. 14 oz. |
| Service sheet scrap (screened) | 10 lbs. 3 oz. |
| Sulphur | 0 lbs. 6 oz. |
| | 30 lbs. 15 oz. |
| Water | 4 lbs. 0 oz. |
| | 34 lbs. 15 oz. |

The above materials were treated in substantially the same manner as described under Example II, and after the various treatments, there was no suggestion of any pink discoloration in the final product.

The use of sulphur to prevent discoloration in compositions is especially effective in compositions in which phenolic resins and asbestos fibres are present. The pink discoloration in compositions containing asbestos fibres and phenolic resins is more pronounced when unmodified phenol formaldehyde type resins are used. However, if sulphur is used as described above, no pink discoloration of the products occurs. Oil modified phenol formaldehyde resins give less pink discoloration than unmodified resins, but, through the addition of sulphur, the pink discoloration in products containing oil modified resins will be eliminated.

It should be understood that the details of the description set forth are only for purposes of illustration and that the invention is to be limited only by the scope of the appended claims.

What we claim is:

1. A molding mixture consisting essentially of a major proportion of asbestos fibers and sufficient phenol-formaldehyde resin to provide a heat curable bond, said mixture being rendered color stable by the presence therein of free sulphur, in amount constituting 1.25-5% of the dry weight of the mixture.

2. A molding mixture consisting essentially of a major proportion of asbestos fibers together with heat curable phenol-formaldehyde resin binder and a small amount of carbon black, said mixture containing free sulphur as a color stabilizer in amount constituting 1.25-5% of the dry weight of the mixture, and said mixture being moistened with a small amount of water.

3. The method of stabilizing molding mixtures consisting chiefly of asbestos fibers and heat curable phenol-formaldehyde resin against color change which comprises, incorporating in said mixture free sulphur in amount sufficient to inhibit color change of the mixture both during storage and during pressure molding and heat curing operations thereon, said sulphur being added to the amount constituting 1.25-5% of the dry weight of the fiber-resin mixture.

DONALD S. BRUCE.
RALPH T. HALSTEAD.